United States Patent
Sathyanarayan et al.

(10) Patent No.: US 6,304,904 B1
(45) Date of Patent: Oct. 16, 2001

(54) METHOD AND APPARATUS FOR COLLECTING PAGE-LEVEL PERFORMANCE STATISTICS FROM A NETWORK DEVICE

(75) Inventors: Seshadri Sathyanarayan; Robert Conrad Knauerhase, both of Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/002,164

(22) Filed: Dec. 31, 1997

Related U.S. Application Data

(60) Provisional application No. 60/041,003, filed on Mar. 27, 1997.

(51) Int. Cl.[7] .................................................. G06F 15/173
(52) U.S. Cl. ..................... 709/224; 709/219; 709/222; 709/205; 709/223
(58) Field of Search ............... 395/182.02; 707/102, 707/106, 101, 202, 10; 702/195; 711/133; 709/227, 224, 217, 219, 205, 222, 201, 202, 239, 226, 206, 223; 379/111; 345/335, 329; 370/389; 713/201; 705/114

(56) References Cited

U.S. PATENT DOCUMENTS

| | | | |
|---|---|---|---|
| 5,373,375 | 12/1994 | Weldy | 358/523 |
| 5,485,579 * | 1/1996 | Hitz et al. | 709/227 |
| 5,517,612 | 5/1996 | Dwin et al. | 395/166 |
| 5,544,320 | 8/1996 | Konrad | 395/200.09 |
| 5,627,886 * | 5/1997 | Bowman | 379/111 |
| 5,673,322 | 9/1997 | Pepe et al. | 380/49 |
| 5,684,969 | 11/1997 | Ishida | 395/342 |
| 5,701,451 | 12/1997 | Rogers et al. | 395/600 |
| 5,706,434 | 1/1998 | Kremen et al. | 395/200.09 |
| 5,721,827 * | 2/1998 | Logan et al. | 709/217 |
| 5,724,556 | 3/1998 | Souder et al. | 395/500 |
| 5,727,157 * | 3/1998 | Orr et al. | 709/224 |
| 5,727,159 | 3/1998 | Kikinis | 395/200.76 |
| 5,742,905 | 4/1998 | Pepe et al. | 455/461 |
| 5,751,933 * | 5/1998 | Dev et al. | 395/182.02 |
| 5,768,510 | 6/1998 | Gish | 395/200.33 |
| 5,787,471 * | 7/1998 | Inoue et al. | 711/133 |
| 5,805,735 | 9/1998 | Chen et al. | 382/239 |
| 5,842,158 * | 11/1998 | Plasek | 702/195 |
| 5,892,917 * | 9/1999 | Myerson | 709/224 |
| 5,895,470 * | 4/1999 | Pirolli et al. | 707/102 |
| 5,905,988 * | 5/1999 | Schwartz et al. | 707/104 |
| 5,931,912 * | 8/1999 | Wu et al. | 709/224 |
| 5,933,832 * | 8/1999 | Suzuoka et al. | 707/101 |
| 5,941,944 * | 8/1999 | Msserly | 709/203 |
| 5,948,061 * | 9/1999 | Merriman et al. | 709/219 |
| 5,960,409 * | 9/1999 | Wexler | 705/14 |
| 6,018,619 * | 1/2000 | Allard et al. | 709/224 |
| 6,112,238 * | 8/2000 | Boyd et al. | 709/224 |
| 6,141,684 * | 10/2000 | McDonald et al. | 709/222 |
| 6,240,444 * | 5/2001 | Fin et al. | 709/205 |

OTHER PUBLICATIONS

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

Lucas et al. Statistical Characterization Wide Area IP Traffic IEEE, Sep. 1997.*

* cited by examiner

*Primary Examiner*—Mehmet B. Geckil
*Assistant Examiner*—Thong Vu
(74) *Attorney, Agent, or Firm*—Kenyon & Kenyon

(57) ABSTRACT

A method for collecting statistics from a network device configured to service requests from one or more other devices coupled thereto includes the steps of maintaining a log file containing one or more entries associated with each request serviced by the network device; identifying a page-level request serviced by the network device; and generating statistics associated with the servicing of the page-level request by the network device from the log file entries associated with the page-level request.

9 Claims, 3 Drawing Sheets

METHOD AND APPARATUS FOR COLLECTING PAGE-LEVEL PERFORMANCE STATISTICS FROM A NETWORK DEVICE

This application claims the benefit of the identically-titled U.S. Provisional Application No. 60/041,003, filed Mar. 27, 1997 by Seshadri Sathyanarayan et al. and assigned to Intel Corporation, the disclosure of which is expressly incorporated herein by reference.

BACKGROUND OF THE INVENTION

1. Field of the Invention

The present invention relates generally to the field of data communications for personal computers (PCs), and in particular to a system for collecting statistics from a network device such as a proxy server.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "web pages" on the World-Wide Web ("the Web").

In a typical network arrangement for accessing the Internet, a plurality of client devices may be configured to channel requests for Internet resources, such as Web pages, through a network device known as a proxy, or proxy server. For example, proxy servers are often used to channel requests for client devices residing behind a so-called "firewall," or for client devices which use dial-up connections to an Internet service provider (ISP). For a variety of reasons, it may be desirable to collect statistics relating to the performance of such network devices, as well as other devices including content servers. Moreover, it may sometimes be desirable to collect such performance statistics at a page level (that is, compiled with respect to each requested Web page processed by the network device). Unfortunately, there are no existing tools for collecting page-level statistics from such network devices. Instead, known monitoring tools, such as the Webstone™ utility distributed by Silicon Graphics Inc., only collect statistical information at a system level. While system-level statistics may be useful for some purposes, for many applications such statistics provide an insufficient level of detail. Accordingly, there is a need for a method and apparatus to collect page-level statistics from a network device.

SUMMARY OF THE INVENTION

An embodiment of the present invention provides a method for collecting statistics from a network device configured to service requests from one or more other devices coupled thereto. According to this embodiment, a log file containing one or more entries associated with each request serviced by the network device is maintained. A page-level request serviced by the network device is identified, statistics are generated associated with the servicing of the page-level request by the network device from the one or more log file entries associated with the page-level request.

DETAILED DESCRIPTION

Figure 1:
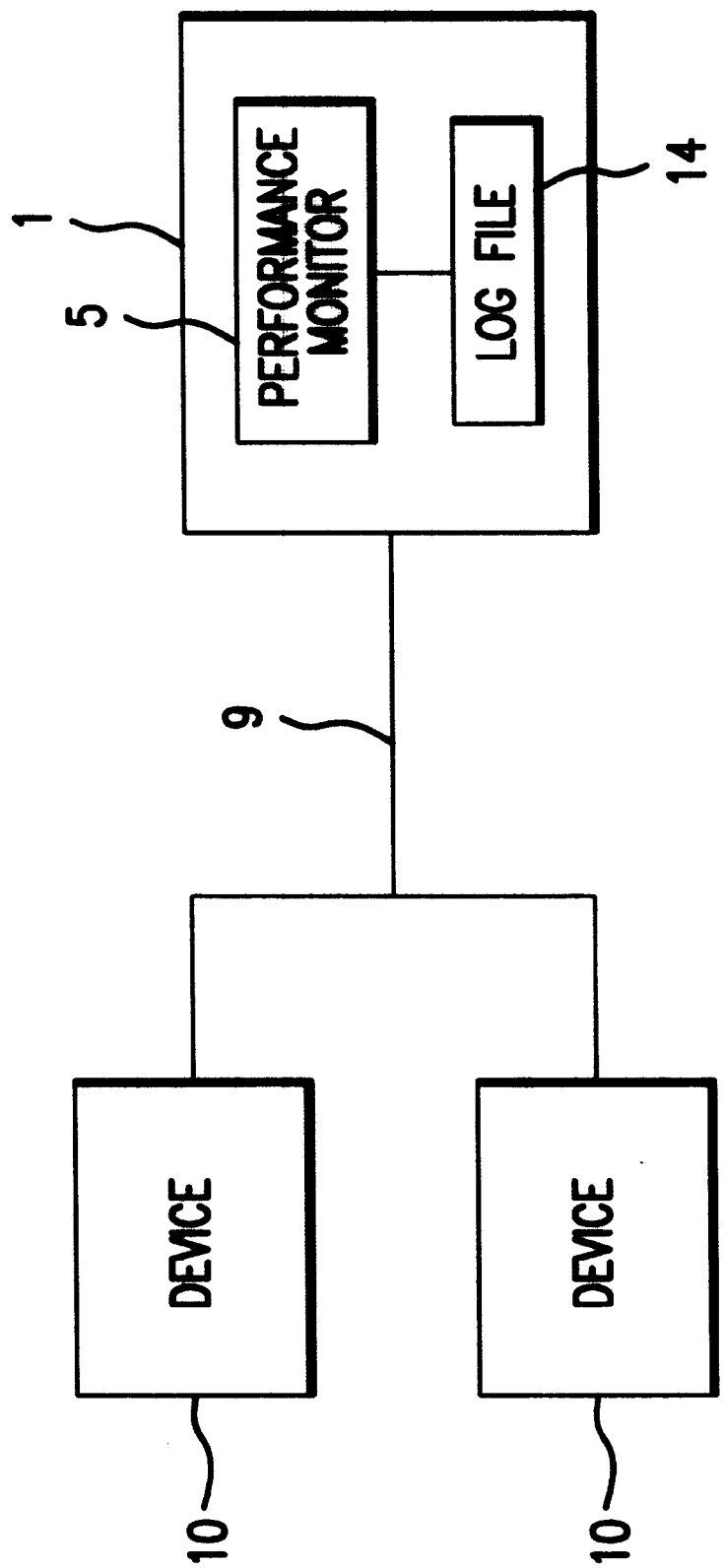
FIG. 1 is a schematic diagram illustrating a network device configured to collect statistics according to a first embodiment of the present invention.

Embodiments of the present invention provide the ability to measure the performance of a network device, such as a proxy or content server, at a page level. With reference to FIG. 1, a network device 1 to which embodiments of the present invention may be advantageously applied is configured to service requests from a plurality of other devices 10 coupled thereto by a communications link 9. Network device 1 may comprise, for example, a firewall or other type of network proxy, a content server or other network server, or a client device including a local proxy. The requests serviced by network device 1 may comprise, for example, HTTP (HyperText Transfer Protocol) requests for Web pages resident on the World-Wide Web. Such requests typically include a so-called page-level request, specifying a URL (Uniform Resource Locator) for the Web page, and one or more object-level requests associated with objects, such as images, related to the page-level request. Depending upon the particular implementation, network device 1 may independently service requests received from other devices 10, or may forward such requests to upstream devices (not shown) for service. In the latter case, network device 1 would typically receive a response from the upstream device and forward that response (either with or without some manipulation, such as transcoding) to the requesting other device 10.

In this particular embodiment, network device 1 includes a log file 14 containing entries associated with the servicing of requests. Log file 14 may include entries associated with both page-level and object-level requests serviced by network device 1. As discussed further below, the entries in log file 14 typically contain information relating to the performance of network device 1 in servicing received requests and/or responses. Network device 1 also includes a performance monitor 5, which may be implemented as a software routine comprising a set of executable instructions. Performance monitor 5 may be programmed to collect page-level statistics for network device 1 by processing entries in log file 14.

Alternatively, network device 1 may itself comprise a content server, or may be implemented as part of a network server, as a stand-alone computer in communication with a network server, or as a distributed system of computers. Network device 1 may be coupled, for example, to an ISP's network, a corporate network, or anywhere on the Internet.

Figure 2:
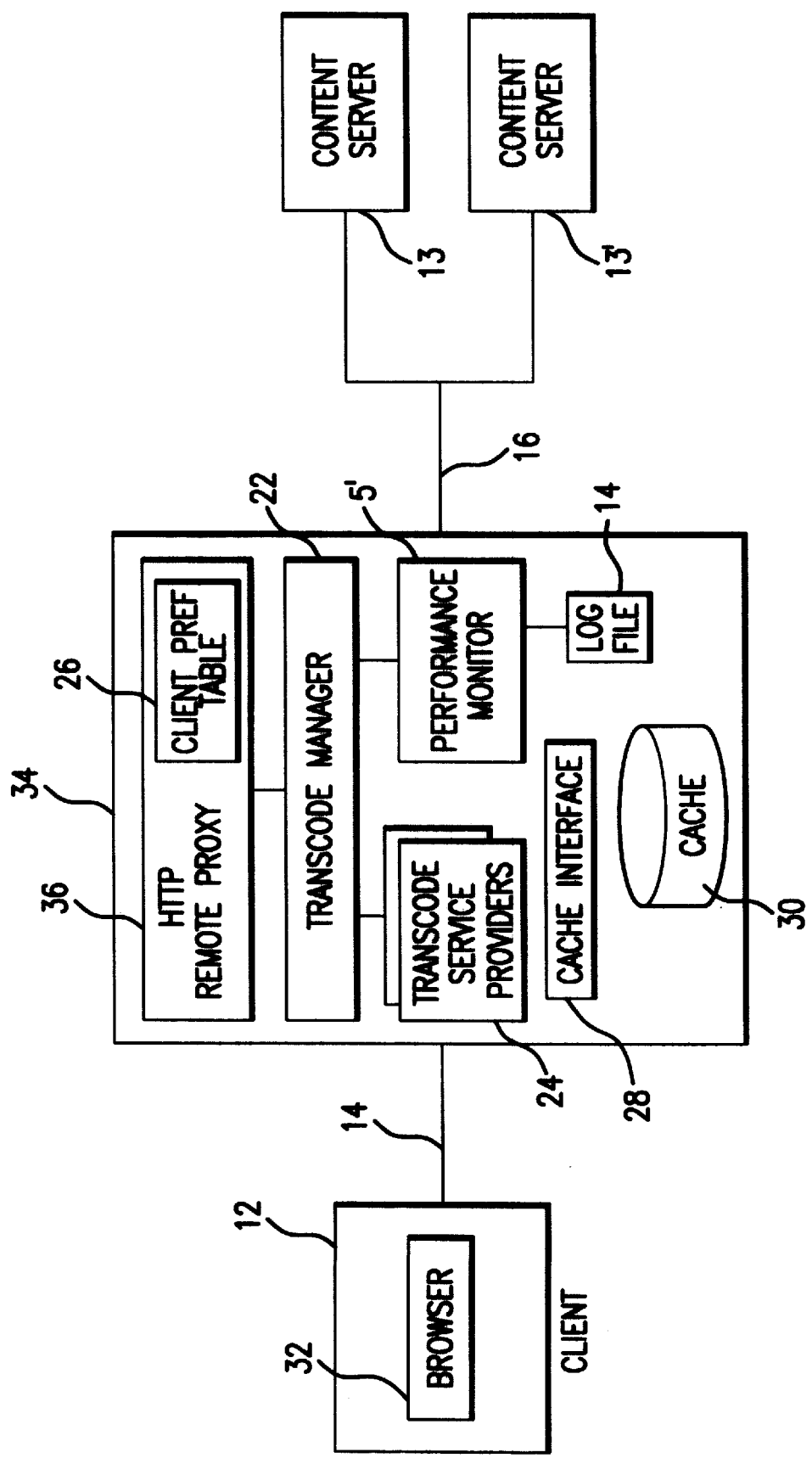
FIG. 2 is a schematic diagram illustrating a network device configured to collect statistics according to a second embodiment of the present invention.

The schematic diagram of FIG. 2 illustrates another type of network device to which embodiments of the present invention may be advantageously applied. According to this particular embodiment, a network client 12 accesses content servers 13, 13' through a transcoding server 34. Network client 12 includes a browser 32, such as the Netscape Navigator v.3.0 browser (although the invention is not limited in this respect), which manages the presentation of data to a user. In the illustrated arrangement, network client 12 is "non-enabled," meaning no specialized transcoding software is preloaded on network client 12. Content servers 13, 13' may comprise, for example, content servers resident on the Internet. In this particular arrangement, network client 12 communicates requests for information to, and receives information from, transcoding server 34 over a client/server communications link 14. Transcoding server 34 in turn communicates with content servers 13, 13' through server/network communications link 16. The respective communications links 14, 16 may comprise any suitable communications media known in the art.

Transcoding server 34 may be configured to provide a wide variety of transcoding services to network client 12 and/or network devices, such as content servers, with which network client 12 communicates. In this context, the term "transcode" refers to virtually any type of addition, deletion or modification of data transmitted to or from network client 12 by or through transcoding server 34. In addition to the collection of statistics as set forth herein, examples of such transcoding services include data compression, image scaling, and dynamic removal of predetermined content. In the context of the present invention, the collection of statistics may be the only transcoding service provided to a particular client device, or may be only one of a variety of services.

As illustrated in FIG. 2, transcoding server 34 may include a transcode manager 22 and a plurality of transcode service providers 24. Transcode manager 22 is configured to act upon data received by transcoding server 34, such as a request for a network object generated by client device 12 or a reply to such a request provided by content server 13. In this particular example, transcode manager 22 is responsible for selectively invoking one or more of transcode service providers 24 based upon a predetermined selection criterion. With reference to FIG. 1, performance monitor 5 may be implemented, for example, as a transcoding service provider 24.

In the arrangement shown in FIG. 2, transcoding server 34 includes an HTTP (HyperText Transfer Protocol) remote proxy 36, capable of accessing content servers 13, 13' over server/network communications link 16. HTTP remote proxy 36 provides functionality different from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcode manager 22, HTTP remote proxy 36 is capable of changing content received from content servers 13, 13' prior to returning it to a requesting network client 12.

Looking more closely at the arrangement shown in FIG. 2, transcode manager 22 is coupled to HTTP remote proxy 36, and manages the transcoding of data to be transmitted from transcoding server 34 to network client 12. To this end, transcode manager 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language), in addition to providing statistical collection functionality as discussed above. Transcoding server 34 may also include a server-side cache memory 30 managed by a server-side cache interface 28. Server-side cache memory 30 may be used to store both original and transcoded versions of content for later transmission to network client 12 without the need to re-retrieve the content from network 18 or to re-transcode the content.

Transcode manager 22 may comprise a relatively simple, uniform interface to HTTP remote proxy 36, and may provide an API (Application Programming Interface) for transcoding data received by HTTP remote proxy 36. Transcode manager 22 manages one or more transcode service providers 24 that are accessed through a common SPI (Service Provider Interface). In this particular implementation, transcode manager 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system.

Like transcode manager 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by transcode manager 22 and its associated transcode service providers 24. Thus, for data integrity and transcoding efficiency purposes, all access to server-side cache memory 30 in this arrangement is through transcode manager 22.

In operation, transcode manager 22 may use a Read( ) call to read data from a specified cached object data stream. For example, transcode service provider 24 may invoke this call and tunnel stream data through HTTP remote proxy 36 directly to network client 12. Similarly, a Write( ) call may be used to cache data from a new HTTP data stream. This call will append an incoming data stream received from, for example, a Web server or transcode service provider 24, to an opened cache stream which may be concurrently read using the Read( ) call.

Transcode manager 22 may be configured to include the following calls:

GetObject(URL, InParams, &OutParams, &OutStream, . . . );

GetScaledObject(URL, InParams, &OutParams, &OutStream, Stage, . . . );

PutObject(URL, InParamStruct, &InStream, &OutParams, &OutStream, . . . ).

Transcode manager 22 may use such calls to manage the provision of requested content to network client 12. For example, the GetObject( ) call may be used to service non-enabled client requests, and returns a non-transcoded (original) version of a specified hypertext object. In this arrangement, transcoding server 34 assumes that each HTTP request has a unique thread that may be blocked until the request is satisfied. Accordingly, the GetObject( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject( ) call is similar to GetObject( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this particular arrangement, when network client 12 requests a hypertext object, HTTP remote proxy 36 uses either the GetObject( ) or GetScaledObject( ) call (depending on if network client 12 is capable of receiving scaled/transcoded datatypes) to retrieve the hypertext object from transcode manager 22. If the hypertext object is not found, transcode manager 22 uses the CreateEntry( ) call to create an entry (in effect, a placeholder) in server-side cache memory 30 for the new object. The new entry is returned to HTTP remote proxy 36, which requests the hypertext object from network 18. As a data stream for the hypertext object is returned, HTTP remote proxy 36 calls transcode manager 22 using the PutObject( ) call, passing into this call the new entry and the handle to the data stream to be placed into the entry. Transcode manager 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it (for example, scan for predetermined content and delete it if found), and place it within the entry of server-side cache memory 30. The current thread immediately returns to HTTP remote proxy 36, which once again calls GetScaledObject( ) (or GetObject( )). This case will always result in a cache hit. This thread then works simultaneously with the separate thread in the PutObject( ) to tunnel data (either original or transcoded) from transcoding server 34 to network client 12.

In this particular embodiment, transcode manager 22 is coupled to a performance monitor 5' programmed to collect page-level performance statistics for transcoding server 34 as discussed herein. Performance monitor 5' may be used, for example, to determine how much time is being saved in downloading content as a result of scaling or other transcoding services provided by transcoding server 34, how well a particular compression algorithm may be working, and the percentage of objects per page effected by such services. Such information may then be put to any of a wide variety of uses, including response time comparisons with other network devices and improving the performance of transcoding services. For such purposes, page-level statistics provide the most meaningful of end-user visible performance metrics (for example, latency). Embodiments of the present invention are therefore directed to collecting such statistics at a page level, including total latency, connect time, objects compressed and percent reduction in bytes transferred per page over different dial-up connections. With particular reference to the embodiment illustrated in FIG. 2, devices such as transcoding server 34 are capable of compressing, scaling or otherwise transcoding content prior to transmitting it to a client device. In order to monitor, collect statistics for, and help improve the performance of such devices, it may be useful to track page-level information such as the number of objects (e.g., images, audio, text, etc.) processed by transcoding server 34 per requested Web page, the size of a compressed Web page, the total end-to-end latency for a compressed Web page, and so on.

A particularly advantageous feature which may be provided by embodiments of the present invention is off-line collection of performance statistics. In other words, page-level performance statistics may be derived after completion of a test run from information logged by transcoding server 34 during the test run. By contrast, most existing performance measurement tools collect performance metrics on-line while tests are being run, which can have the undesirable effect of degrading the performance of other applications active on transcoding server 34 during the test run.

Figure 3:
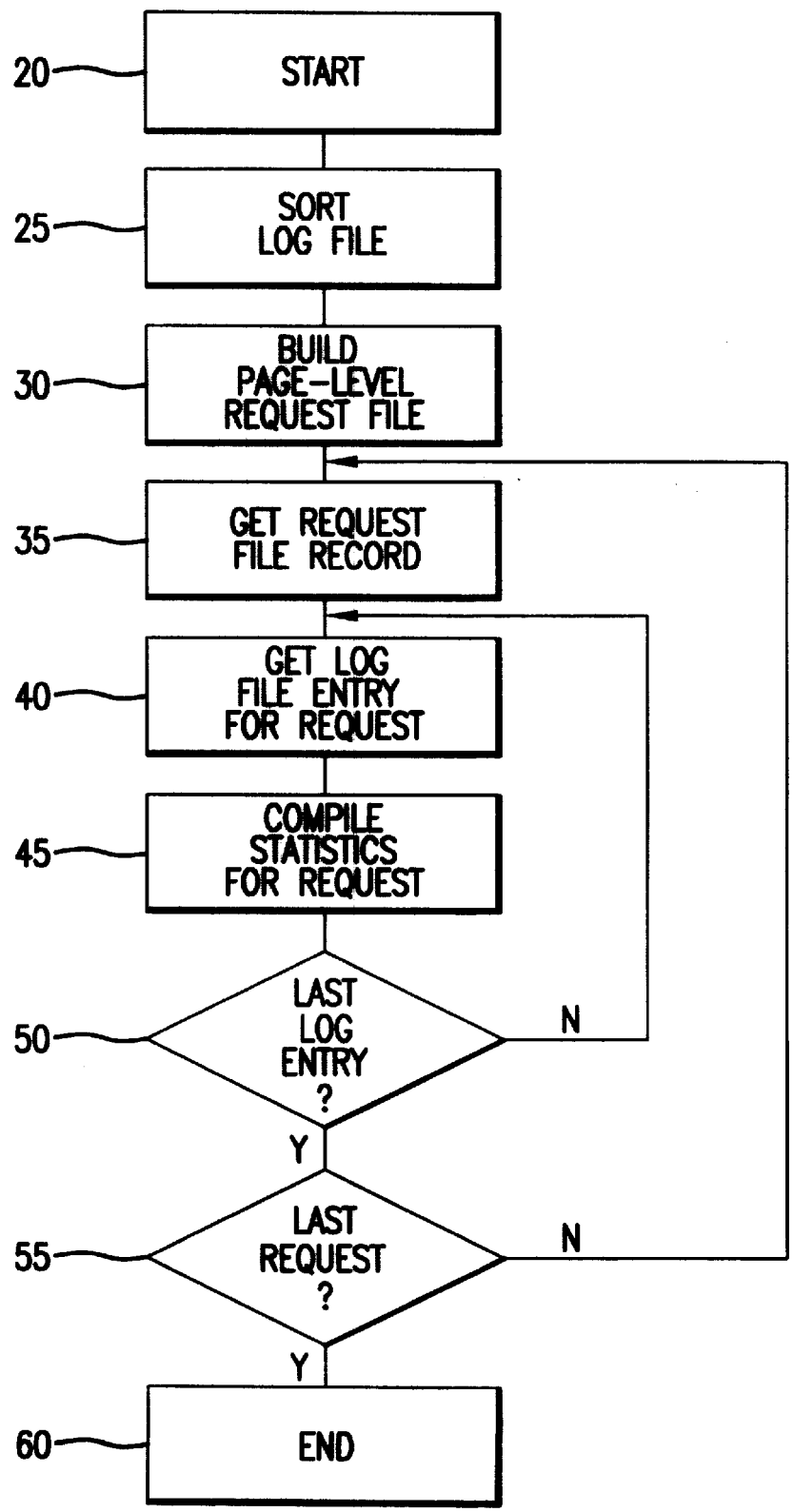
FIG. 3 is a flow diagram illustrating a method for collecting performance statistics according to an embodiment of the present invention.

FIG. 3 provides a flow diagram illustrating a method according to another embodiment of the present invention. To assist in describing this embodiment, structural elements are described using the reference numbers for the embodiment illustrated in FIG. 1; however, it should be noted that the method of FIG. 3 is not limited to that particular structural implementation. In general, the approach of the illustrated embodiment is to sort or otherwise process a system log maintained by network device 1 to organize entries in log file 14 (containing performance-related data) associated with Web page requests (and the individual objects associated with such requests) in time sequence by user (or client device 10) identified, for example, by IP address. Information collected in this manner may then be used to measure a variety of page-level metrics, including end-to-end page latency, time taken to compress each page, latency reduction (for example, with respect to the original, uncompressed page), percent fewer bytes transferred to the client, original and compressed page sizes, average of original and compressed object sizes (typically for affected objects only), and the number of effected objects/images.

The method illustrated in FIG. 3 makes use of information generally maintained in a log file by network devices configured to service HTTP requests. Such devices typically log the following items of information for each request that they service: HTTP request string; sequence number assigned to each request as the request is received; IP address of a requesting client device; time of request; whether a requested object was found in a cache storage; original size of the requested object; size of the requested object after transcoding; return code for the requested object; time-stamp for when the request was first received by the network device; time at which the request was sent to a content server; time at which the response (for example, the requested page or object) was received from the content server; time at which transcoding was complete and the requested object forward to the requesting client device; and time at which the service is complete. For some purposes, it may be necessary to enhance the existing logging facilities of a network device to ensure that information is logged for desired statistics.

The method illustrated in FIG. 3 may be performed either on-line or off-line, although for many types of network devices off-line processing is generally preferable. Where off-line processing is desired, a test run may be performed in which a set of predetermined HTTP requests specifying particular Web pages to be retrieved are sent to network device 1 from one or more client devices 10 (each with their own IP addresses). Such requests may be sent to network device 1 individually or in batches. The requests and the resulting log file 14 from network device 1 may then be used to compile page-level statistics as discussed below.

According to this particular embodiment, the log file from network device 1 is first sorted by IP address to group all of the requests from each client device 10, effectively creating separate log files for each client device 10 (Step 25). The requests are then further sorted by timestamp and request ID (a unique sequential identifier assigned by network device 1) to ensure that requests for any individual objects (for example, images) associated with a requested Web page immediately follow the request for the Web page itself (Step 25). The use of the request ID will resolve a situation where two requests contain equal timestamps, ensuring that page requests are in the order in which they were received by network device 1.

Once the log file is properly sorted, page-level requests may be extracted to a separate request file based on, for example, characteristics of the URL (Step 30). Alternatively, a request file used to generate the test load on network device 1 may be used. Then, for each entry in the request file, the location of that request in the sorted log file is determined. This processing serves the dual purpose of (1) eliminating from further processing any requests that were not serviced by network device 1; and (2) providing an index into the sorted log file for ready access to the first log entry associated with each serviced request. The request file may also be sorted and any duplicate entries deleted to ensure there is only one entry for each serviced request.

Once the request file and log file are built and/or properly sorted, the request file may be sequentially processed to compile desired page-level performance statistics. For each entry retrieved from the request file (Step 35), here comprising a tuple of <HTTP request, log file index>, the associated log file index is used to access the log file entry or entries associated with that request (Step 40). The information carried in the log file entries may then be used to derive page-level performance statistics (such as, time to download, bytes sent, bytes effected by transcoding, etc.) by, for example, consolidating a plurality of log file entries associated with a given page-level request (Step 45).

The embodiment illustrated in FIG. 3 provides only one possible implementation of a method for compiling page-level statistics for network device 1, and is not intended to limit the scope of the claimed invention. Persons skilled in the art will recognize that many variations are possible in keeping with the teachings herein.

Embodiments of the present invention may be distributed, for example, as a set of instructions residing on a storage medium. Such a storage medium might be a memory of a computer; a piece of firmware; a portable storage device, such as a diskette or other magnetic storage device, or a CD-ROM; or any other medium on which it is known to store executable instructions.

Although the present invention has been described largely with reference to embodiments for processing requests for data from the Internet, persons skilled in the art will recognize that it is equally applicable to other networking environments. For example, embodiments of the present invention may be used to measure the performance of a network device arranged between a client device and an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, some or all of the features described above may be used to measure the performance of a content server. Likewise, embodiments of the present invention may be readily adapted for use with communications protocols other than HTTP. Persons skilled in the art will recognize from the foregoing detailed description that many other alternatives, modifications and variations are possible.

What is claimed is:

1. A method for collecting page-level performance statistics from a network device configured to perform transcoding services in connection with responding to requests for web pages by client devices coupled thereto, wherein the requested web pages include one or more associated objects, said method comprising:

servicing a request for a web page by a client device, including retrieving the requested web page and each of its associated objects, transcoding at least one of the retrieved web page or an associated object, and returning the web page and its associated objects to the client device;

maintaining a log file containing a plurality of entries associated with each request for a web page serviced by the network device, the plurality of entries comprising a page-level entry corresponding to the web page and one or more object-level entries corresponding to the objects associated with the web page;

identifying a page-level entry in the log file for a given web page request serviced by the network device;

identifying each object-level entry in the log file for objects associated with the web page; and generating page-level performance statistics associated with the servicing of the given web page request by the network device using information compiled from the identified page-level and object-level log file entries, the page-level performance statistics providing a measure of performance improvement attributable to the transcoding performed by the network device in connection with servicing the given web page request.

2. The method of claim 1, wherein said step of generating page-level performance statistics comprises generating a measure of latency associated with servicing of the web page request.

3. The method of claim 1, wherein said step of generating page-level performance statistics comprises generating a measure of time taken by the network device to transcode the web page or associated object.

4. The method of claim 1, wherein said step of generating page-level performance statistics comprises comparing a length of time required to return a web page and its associated objects with transcoding and without transcoding.

5. The method of claim 4, wherein said step of generating page-level performance statistics further comprises comparing a measure of size for said transcoded and untranscoded web page or associated object.

6. An apparatus for collecting page-level performance statistics from a network device configured to perform transcoding services in connection with responding to requests for web pages by client devices coupled thereto, wherein the network device includes a log file containing a plurality of entries corresponding to each web page request serviced by the network device, the plurality of entries comprising a page-level entry corresponding to the web page and one or more object-level entries respectively corresponding to one or more objects associated with the web page, the network device transcoding at least one of the web page or an associated object prior to returning it to the client device, said apparatus comprising a computer programmed to perform the steps of:

identifying a page-level entry in the log file for a given web page request serviced by the network device;

identifying each object-level entry in the log file for the objects associated with the given web page; and generating page-level performance statistics associated with the servicing of the given web page request by the network device using information compiled from said identified page-level and object-level entries in the log file, the page-level performance statistics providing a measure of performance improvement attributable to the transcoding performed by the network device in connection with servicing the given web page request.

7. A storage medium containing a set of instructions for execution by a computer, the set of instructions enabling the computer to collect page-level performance statistics for a network device configured to perform transcoding services in connection with responding to requests for web pages by client devices coupled thereto, wherein the network device maintains a log file containing a plurality of entries associated with each web page request that it services, the plurality of entries comprising a page-level entry corresponding to the web page and one or more object-level entries respectively corresponding to one or more objects associated with the web page, the network device transcoding at least one of the web page or an associated object prior to returning it to the client device, said set of instructions comprising instructions for:

identifying a page-level entry in the log file for a given web page request serviced by the network device;

identifying each object-level entry in the log file for the objects associated with the given web page; and generating page-level performance statistics associated with the servicing of the given web page request by the network device using information compiled from said identified page-level and object-level entries in the log file, the page-level performance statistics providing a measure of performance improvement attributable to the transcoding performed by the network device in connection with servicing the given web page request.

8. The storage medium of claim 7, wherein said storage medium comprises a magnetic storage device.

9. The storage medium of claim 7, wherein said storage medium comprises a memory of the computer.

* * * * *